United States Patent

[11] 3,554,096

| [72] | Inventor | Everett J. DeJager<br>Cincinnati, Ohio |
|---|---|---|
| [21] | Appl. No. | 782,224 |
| [22] | Filed | Dec. 9, 1968 |
| [45] | Patented | Jan. 12, 1971 |
| [73] | Assignee | Xomox Corporation<br>Cincinnati, Ohio<br>a corporation of Ohio |

[54] VANE-TYPE ACTUATOR
5 Claims, 3 Drawing Figs.

[52] U.S. Cl. .................................................. 92/125,
92/170
[51] Int. Cl. .................................................. F01c 9/00
[50] Field of Search ........................................... 92/121,
122, 123, 124, 125, 168, 170; 103/147, 146, 145;
251/306; 308/236

[56] References Cited
UNITED STATES PATENTS

| 2,012,817 | 8/1935 | Horton et al. | 92/124 |
|---|---|---|---|
| 2,285,621 | 6/1942 | Sibley | 92/123X |
| 2,657,896 | 11/1953 | Muller | 251/306 |
| 2,888,879 | 6/1959 | Gaarder | 92/170X |
| 3,359,870 | 12/1967 | Purcell | 92/121 |
| 3,369,924 | 2/1968 | Duggins et al. | 308/238 |
| 3,444,789 | 5/1969 | Hansen | 92/121 |

Primary Examiner—Martin P. Schwadron
Assistant Examiner—Leslie J. Payne
Attorney—J. Warren Kinney, Jr.

ABSTRACT: The performance of a vane-type actuator or fluid motor is greatly enhanced by coating the inner surfaces of the piston chamber with Teflon-S, a material which endows the chamber surfaces with a fluorocarbon-rich surface stratum which is highly wear-resistant, nearly frictionless of nature, and self-renewing in the presence of wear, scoring or scuffing.

PATENTED JAN 12 1971   3,554,096

INVENTOR.
EVERETT J. De JAGER
BY
J. Warren Kinney Jr.
ATTORNEY

VANE-TYPE ACTUATOR

This invention relates to a vane-type actuator, or fluid motor, which embodies an oscillatory driving shaft for imparting motion to various kinds of mechanisms or drivable elements. Actuators of the type disclosed may be operated by pneumatic or hydraulic fluid pressure.

Vane-type actuators are capable of many uses, such as closing and opening large plug-type valves and the like, or performing other services, particularly where push-pull or reciprocatory movements are involved. Such actuators usually embody a housing having an arcuate chamber in which a piston in the form of a vane attached to a drive shaft, is impelled to and fro by pressure of fluid admitted at one side or the other of the piston or vane, with a concurrent exhaust of fluid at the opposite side thereof. Accordingly, the drive shaft may have limited rotation in either of two directions, depending upon which side of the piston is exposed to a thrust of fluid under pressure.

In the past, the vanes or pistons of these actuators required rather frequent servicing or replacement due to wear, particularly under heavy duty service or adverse conditions of operation. In certain applications, the piston would fail to respond promptly to the impelling force of the operating media, usually compressed air, particularly when the actuator was infrequently operated and its piston became struck at one end of its stroke within the chamber. This resulted in erratic and undependable operation, particularly as to timing, which in some applications was of vital importance.

An object of the present invention is to improve the performance and reliability of operation of a vane-type actuator, with the use of simple and inexpensive means.

Another object of the invention is to substantially reduce frictional drag of a piston within its housing chamber, and to thereby greatly extend the useful life of the actuator and its constituent parts.

Another object of the invention is to effectively preclude leakage of operating fluid past the vane or piston of the apparatus, this resulting in high efficiency of operation, ready response, and a smooth and positive drive.

The foregoing and other objects are attained by the means described herein and illustrated upon the accompanying drawing, in which.

Figure 1:
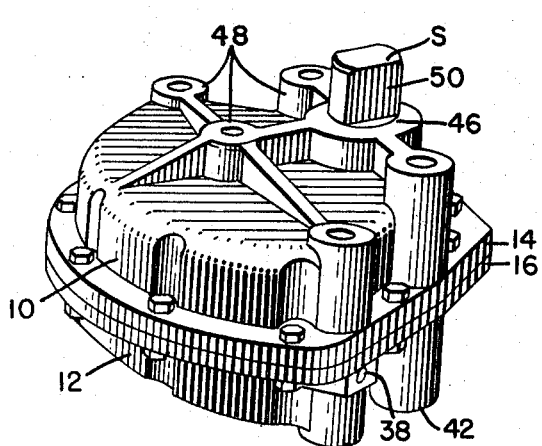
FIG. 1 is a perspective view of the improved actuator embodying the present invention.

The housing elements 10 and 12 may each comprise a metal casting incorporating connecting flanges 14 and 16, respectively, whereby one housing element may be mounted upon the other with a fluid-tight joint connection therebetween. The fluid-tight joint connection may include suitable gasketing means interposed between the flanges 14 and 16, if desired. The housing elements may be secured to one another by means of bolts or screws inserted in a series of holes 18 provided in the flanges, as will be understood.

Housing element 12 is seen to include a chamber 20 having an arcuate wall 22 subtending two substantially flat or planar end walls 24 an 26, which meet at a rounded apex 28. A flat planar sidewall 30 completes the chamber 20, and spans all of the walls 22, 24, 26. At 32, adjacent to rounded apex 28, the sidewall 30 is bored to provide a bearing in which a journal 34 of piston or vane P is supported for partial rotation, or oscillation. The numerals 36 and 38 denote ports for feeding and exhausting operating fluid to and from chamber 20, said ports being located in or near the walls 24 and 26. The significance to the present invention, but may be merely considered mounting means for various purposes not of concern herein.

Figure 2:
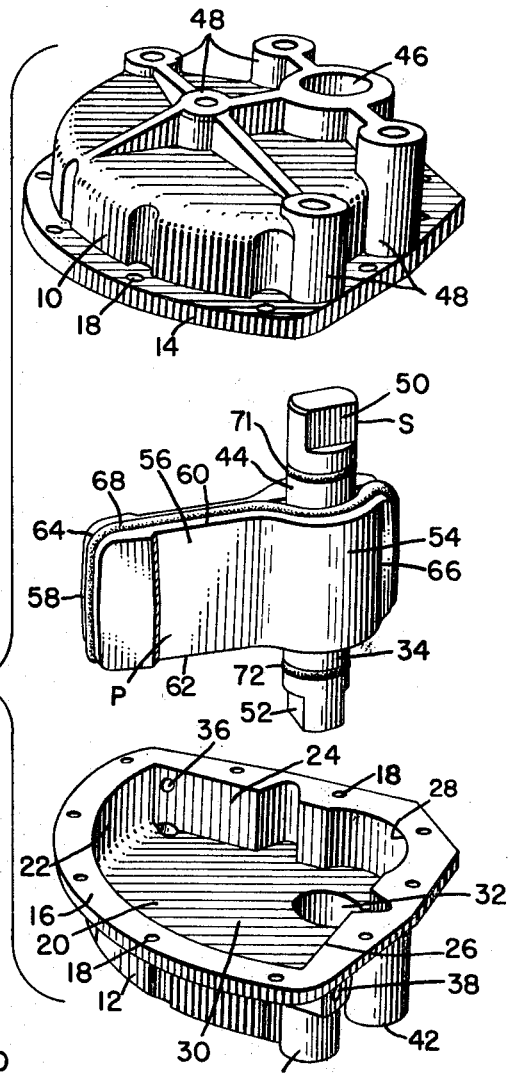
FIG. 2 is an exploded perspective view of the actuator.
Figure 3:
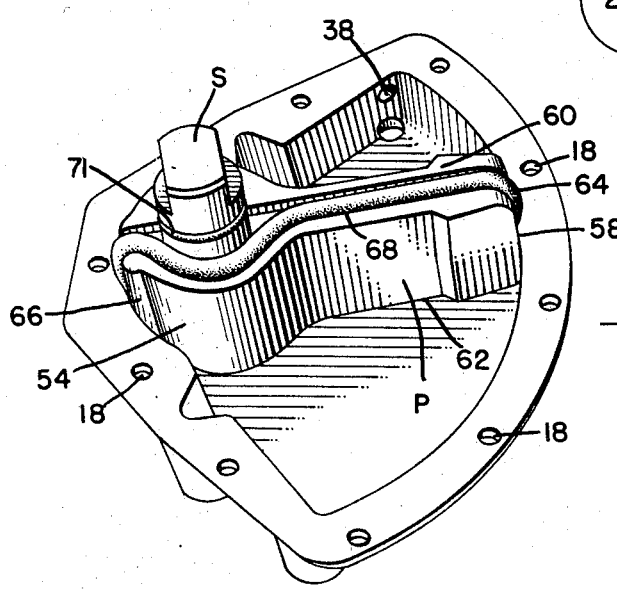
FIG. 3 is an enlarged perspective view of one housing section or element of the actuator, showing its relationship to a vane-type piston.

It should be understood that the housing element 10 of FIG. 2 contains a chamber similar to that at 20 of housing element 12, the chambers being preferably of the same shape and depth, to accommodate piston P. The chamber of housing element 10, however, need not be provided with ports such as 36 and 38, since these ports serve both chambers when the housing elements are joined. The chambers mentioned may be formed with unequal depth dimensions, if desired, but together they are required to accommodate the width of piston P, this being the dimension between journals 34 and 44. The numeral 46 denotes a bore or bearing in housing part 10, for rotational support of the journal 44 formed on drive shaft S.

The several reference numerals 48 indicate bosses on housing part 10, which may be used as mounts for the actuator, or for other purposes not material to the present invention. One or both ends of shaft S may be furnished with means 50 and 52, herein shown as flats by way of example, for effectively mounting upon the shaft a lever or equivalent means for transmitting motion of the shaft to a machine or mechanism to be actuated or controlled by rocking movements of the drive shaft.

The vane or piston P may consist of a solid block of metal or other rigid material, having at one end a hub 54 concentric with the axis of shaft S. The vane 56 extends perpendicularly from the shaft axis, and has a swingable outer end or toe 58. The vane or piston is of substantial thickness, so that its end 58 and its longitudinal radial edges 60 and 62, may be grooved to receive therein a gasket or seal member 64. The hub 54 at its opposite ends likewise is grooved at one side of the shaft axis, and a connecting groove is cut into the hub parallel to the shaft axis at that side of the axis which is opposite to vane end 58.

The gasket or seal member 64 may be in the form of an endless resilient O-ring of considerable size, supported in a groove which is continuous along the edges 58, 60, 62 and along the opposite end portions of hub 54, including the connecting groove which extends along the heel portion 66 of the vane in parallelism with the axis of shaft S. Thus, the O-ring 64 of the piston circumscribes the thickness of the vane or piston. The continuous groove 68 which supports the piston O-ring, is of a proper depth at all locations, to permit a slight outward projection of the O-ring material at all points along the groove.

From the foregoing, it will be understood that in the assembled condition of the apparatus, portions of the piston O-ring 64 will contact, wipe, and seal against the walls 22, 24, 26, 28, and 30, of each of the housing elements or members 10 and 12. The O-ring 64 may be formed of a rubberlike material such as Buna-N, Durometer 50 hardness, or a similar or equivalent material. Ring 64 may be substantially circular in cross section, to fit groove 68.

To avoid leakage along shaft S, the journals 34 and 44 may be annularly grooved to support sealing elements in the form of O-rings 71, 72. These O-rings may desirably be of a rubberlike material, an example of which is Buna-N, Durometer 70, effective to form an effective seal within bearings 32 and 46.

As hereinbefore noted, means is provided to very substantially reduce frictional drag between the vane or piston P and the walls of the housing chambers, for the purposes of enhancing the performance and reliability of operation, extending the useful life of the apparatus and its constituent parts, thereby minimizing servicing work and expenses, and improving the efficiency of operation, ready response, and the desired smooth and positive action of the drive shaft.

Such improvements, among others, results from applying to the inside surfaces of the piston chamber of the housing parts 10 and 12, a coating of Teflon-S or equivalent material, which possesses highly desirable antistick, self-lubricating, wear-resisting qualities. Such material is described as a plastic of the group consisting of polyethylene and its halogen substitute products characterized by high antifriction properties and effective resistance to corrosives, solvents, and abrasion. The coating carried by the piston chamber walls ensures a smooth frictionless gliding of piston gasket 64 along all contact areas of the chamber walls, without any tendency of the gasket to stick to the walls even though the actuator might have remained idle or out of use for an extended period of time. Easy starting of the piston movement is thereby assured.

The product Teflon-S is applicable to the chamber walls by spraying, dipping, brushing or any other convenient technique, and requires baking onto the part and heat curing at approximately 600° F. metal temperature in order to attain maximum stratum hardness and abrasion resistance. The coating endows the coated surface with a continuous fluorocarbon-rich surface stratum which is self-renewing or self-healing in the event of scuffing or scoring, and assures highly effective sealing against fluid leakage past the coated surfaces. Moreover, the coating prolongs the trouble-free maintenance period of the actuator parts, and discourages deterioration thereof from attack by corrosive fluids, solvents, and the like, whether alkaline or acid of nature.

The supplier of Teflon-S, E. I. DuPont DeNemours & Co., Inc., identifies the product Teflon-S as a 958—200 Series single-coat, nonstick, self-lubricating finish based on a special fluorocarbon resin and suitable modifiers dispersed in organic solvents.

The Teflon-S coating advantageously may be applied to the piston and its shaft, as well as to the chamber walls, if desired.

Under severe tests of actuators treated with Teflon-S, the actuators have been subjected to cycling at three-second intervals, under load, through more than 300,000 cycles, and when disassembled and examined were found to show no discernable wear of the coated surfaces or the O-rings of Buna-N. In addition, the power output of the actuator was materially enhanced due to the frictionless sweep of the piston within its chamber, and the ability of all sealed and coated surfaces to overcome fluid leakage.

I claim:

1. A fluid-pressure operated rotary actuator, comprising: a rigid housing having a piston chamber therein characterized by an arcuate wall, a pair of end walls subtended by said arcuate wall, and a pair of planar opposed sidewalls spanning said arcuate wall and said end walls, said end walls meeting one another at a locus of intersection; bearing means on the housing at said locus of intersection; a one-piece vane-type piston having a hub at one end; a shaft fixed to said hub, said shaft being rockingly supported in the bearing means of the housing; said vane having a swingable end and integral stop means on opposite sides of the swingable end to stop the vane in its travel spaced from the end walls, and a pair of radial edges on said vane extending from the hub to said swingable end; a continuous groove formed in the swingable end and the radial edges of the vane, and in the hub of the vane; an endless resilient O-ring seated in said groove substantially circumscribing said vane and said hub, the O-ring being slightly extended outwardly from said groove to wipe the housing chamber along the arcuate wall, the sidewalls, and the locus of intersection of the end walls; and a self-lubricating antifriction, wear resistant coating covering all the walls of the piston chamber wiped by said O-ring.

2. An actuator as in claim 1 wherein said O-ring is formed of a material of the class Buna-N.

3. An actuator as in claim 1 wherein said piston and said shaft have a coating such as applied to the chamber walls wiped by the O-ring.

4. An actuator as in claim 3 wherein said coating is a plastic material of the group consisting of polyethylene and its halogen substitute products characterized by high antifriction, self-lubricating, wear-resistant properties.

5. An actuator as in claim 4, wherein the coating is Teflon-S.